3,271,423
SUBSTITUTED 1,4-DIPHENYLAMINO ANTHRA-
QUINONE SULFONIC ACID DYESTUFFS
Leon Katz, Springfield, and Wilhelm Schmidt-Nickels,
Little York, N.J., assignors to General Aniline & Film
Corporation, New York, N.Y., a corporation of Delaware
No Drawing. Filed Dec. 18, 1964, Ser. No. 421,763
4 Claims. (Cl. 260—372)

This application is a continuation-in-part of our applications Serial Nos. 79,143 and 79,167, both filed December 29, 1960, and both now abandoned.

This invention relates to novel dyestuffs, and more particularly to novel direct-dyeing dyestuffs of the anthraquinone series, and methods for making such dyestuffs.

In accordance with this invention, we have discovered the novel dyestuffs of the formula (I)
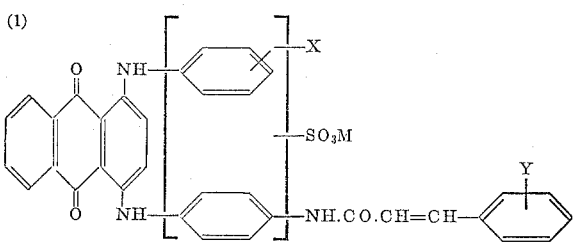

wherein X is selected from the group consisting of H, lower alkyl, lower alkoxy, and halogen; M is selected from the group consisting of H and alkali metal; Y is selected from the group consisting of H, nitro, amino, lower alkyl, and lower alkoxy; and the $SO_3M$ group is bonded to one of the bracketed benzene rings by sulfonation of the intermediate of the formula (II)
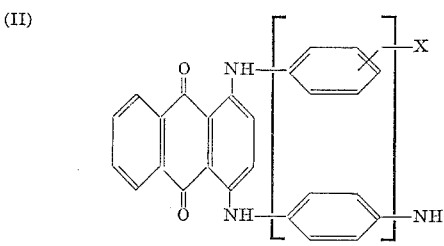

These dyestuffs are valuable direct-dyeing dyestuffs yielding on natural and regenerated cellulose such as cotton and rayon fibers and other cellulosic articles green shades of good fastness properties, particularly to light and anticrease resin treatments.

In the above formula, lower alkyl includes methyl, ethyl and the like, lower alkoxy includes methoxy, ethoxy and the like, halogen includes fluorine, iodine, and preferably chlorine and bromine, and alkali metal includes lithium, and preferably sodium and potassium. It will be understood that the anthraquinone nucleus may contain inert substituents such as the above-described lower alkyl and lower alkoxy groups.

Our invention also includes the preparation of dyestuffs of the above Formula I by reacting a cinnamoyl halide of the formula

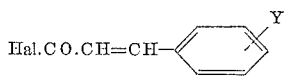

wherein Hal represent halogen such as chlorine or bromine; and Y has the values given above, with an equimolar amount of the sulfonated intermediate of the above Formula II, in an aqueous medium at a temperature of about −3 to 30° C. and a pH of about 8–10. In carrying out the reaction, the cinnamoyl halide compound is preferably first dissolved in an inert relatively low boiling organic solvent such as chlorobenzene, chloroform, trichloroethylene, carbon tetrachloride, benzene, or acetone which is removed by distillation upon completion of the reaction.

The pH of the reaction medium is maintained within the above range by addition of the known inorganic acid binding agents such as the oxides, hydroxides, carbonates, bicarbonates, acetates, and borates of lithium, sodium and potassium, the oxides, hydroxides and carbonates of calcium and magnesium etc. Such agents may be added at the beginning or preferably intermittently with the cinnamoyl halide (preferably in organic solvent solution) to the aqueous medium containing the said intermediate whereby the hydrogen halide is neutralized as it is split off during the reaction.

Following completion of the reaction, the dyestuff is precipitated from the reaction medium by salting out followed by filtration, washing and drying. The dyestuff wherein Y is amino may be obtained from the dyestuff wherein Y is nitro by reduction, as with iron borings in water at a temperature of 90–100° C., or other reducing agent.

The intermediates of the above Formula II may be prepared by first reacting a compound of the formula (III)
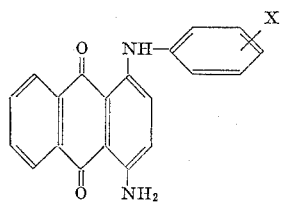

wherein X has the values given above, with an equimolar amount of a 4-nitro-1-halobenzene such as 4-nitro-1-chlorobenzene or 4-nitro-1-bromobenzene in the presence of an acid binding agent and a copper catalyst in an inert organic solvent at a temperature of about 150–220° C. to produce a compound of the formula (IV)
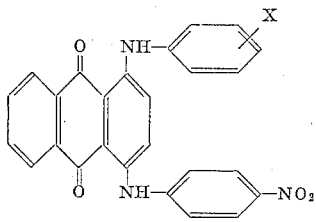

Compound III is readily prepared by reacting aniline or an X-substituted aniline with bromamine acid (1-amino-4-bromoanthraquinone-2-sulfonic acid), and then desulfonating the resulting compound in known manner as by treatment with Cerelose and alkali (caustic soda or potash). In this reaction involving Compound III, any of the usual acid binding agents may be employed, those of the inorganic type being preferred such as the oxides, hydroxides, carbonates, bicarbonates, acetates, and borates of lithium, sodium and potassium, the oxides, hydroxides and carbonates of calcium and magnesium, etc. Any copper compound, or metallic copper, may be employed as catalyst. To facilitate the reaction, the inert organic solvent should boil within or above the desired temperature range of 150–220° C. Examples of suitable solvents include nitrobenzene, dichlorobenzene, trichlorobenzene, chloronaphthalene, etc.

Compound IV is then subjected to the action of a reducing agent to reduce the nitro group to an amino group. According to the preferred manner, this reduction is carried out by the action of sodium sulfide in alcohol at reflux temperatures, although any other suitable reducing means may be employed whereby a compound of the above Formula II is produced.

Compound II is the monosulfonated in known manner. The preferred method involves subjecting Compound II to the action of sulfuric acid of at least 96% concentration, including oleum, at temperatures of about 60–120° C. To insure sulfonation of all the molecules of Compound II, it is preferred to carry the sulfonation slightly past the monosulfonic acid stage, whereby a relatively minor proportion of such molecules are disulfonated in one or both of the bracketed benzene nucleii.

The invention is illustrated by the following examples which are not intended to be in any way limitative. All parts and proportions referred to herein and in the appended claims are by weight unless otherwise indicated.

*Example 1*

(a) A charge of 50 parts by volume 100% $H_2SO_4$, 5 parts by weight of 1-phenylamino-4-(4'-aminophenylamino)-anthraquinone, was stirred at 100° C. for 1 hour. It was then cooled to 20° C. and poured under agitation into 1000 parts of ice and water. The sulfonation product precipitated. It was filtered off and washed with water until the filtrate began to run with color. The filtrate then ran neutral. When the cake had the consistency of a paste the filtration was stopped and the paste was stored in a closed container. Weight obtained =61.2 parts by weight of 9.5% paste=5.8 parts by weight equivalent to 97% of the theory of the compound of the formula:

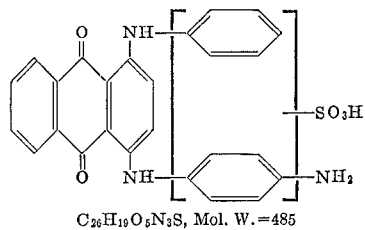

$C_{26}H_{19}O_5N_3S$, Mol. W.=485

Found: S=7.7%. Theory $C_{26}H_{19}O_5N_3S$: S=6.6%.

(b) A charge of 600 parts of water, 43.1 parts by weight of an 11.27% aqueous paste of monosulfonated 1-phenylamino-4-(4'-aminophenylamino) - anthraquinone (=4.85 parts 100%) prepared as described in (a) above was adjusted to a pH of 9.7 by the addition of 5% sodium hydroxide solution.

A p-nitrocinnamoyl chloride solution was prepared by refluxing for 3 hours a charge of 110 parts by volume (dry distilled) chlorobenzene, 11 parts thionyl chloride, 4.0 parts by weight p-nitrocinnamic acid, and a trace of pyridine (about 0.05 part by weight). Finally 50 parts by volume of liquid (excess thionyl chloride and chlorobenzene) was distilled off leaving a solution of p-nitrocinnamoyl chloride in chlorobenzene.

At 0–5° C. and a pH range of 8–10 all of the p-nitrocinnamoyl chloride solution was added to the above charge under vigorous agitation during two hours alternatingly with 5% sodium hydroxide solution. After all was added the charge was stirred at 0–5° C. for 3 hours more, adding from time to time more 5% sodium hydroxide solution to prevent the pH from falling below 8. After removal of the cooling bath, the charge was stirred an additional 15 hours. A test dyeing remained green on addition of dilute sulfuric acid indicating the completion of the reaction. If the reaction is complete the dyeing will turn bluish. The charge was finally steam distilled to remove all the chlorobenzene. After the steam distillation the pH was 9.7. It should be between 8 and 10 and has to be adjusted if found to be below 8. The dyestuff was filtered off and washed with cold water for removal of salt until the filtrate ran with a green color. Finally the dyestuff was dried.

It has the formula

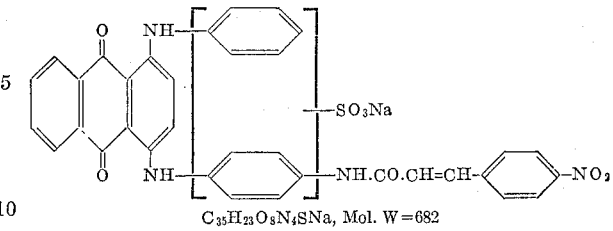

$C_{35}H_{23}O_8N_4SNa$, Mol. W.=682

Weight obtained=6.0 parts by weight equivalent to 88% of the theory.

The product is a direct dyestuff for cotton and rayon giving strong green shades particularly on rayon. Resin treated dyeings (urea+formaldehyde) change only a little bluer with little loss in strength. The lightfastness is very good both on straight and resin finished dyeings (cotton about 30 hours, rayon about 40 hours under the fadeometer).

*Example 2*

(a) A charge of 150 parts by volume 100% $H_2SO_4$, 15 parts by weight of 1-(p-toluidino)-4-(4'-aminophenylamino)-anthraquinone was stirred at 100° C. for 3½ hours. After allowing to cool to room temperature the charge was poured under agitation into 3000 parts of ice and water. The sulfonation product precipitated. It was filtered off and washed with water until the filtrate began to run with color. The filtrate then ran neutral. When the cake had the consistency of a paste the filtration was stopped and the paste was stored in a closed container. Weight obtained—66.8 parts by weight of 24.3% paste=16.2 parts by weight equivalent to 90% of the theory of the compound of the formula:

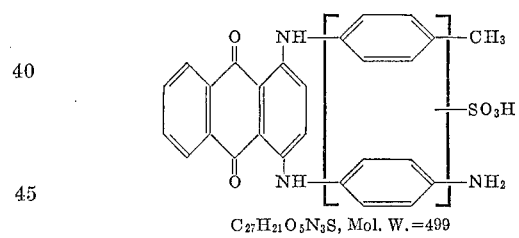

$C_{27}H_{21}O_5N_3S$, Mol. W.=499

Found: S=7.2%. Theory $C_{27}H_{21}O_5N_3S$: S=6.4%.

(b) A charge of 600 parts of water, 28.4 parts by weight of a 17.6% aqueous paste of monosulfonated 1-(p-toluidino)-4-(4'-aminophenylamino)-anthraquinone (=4.99 parts 100%), prepared as described in (a) above was adjusted to a pH of 9.0 by the addition of 5% sodium hydroxide solution.

A p-nitrocinnamoyl chloride solution in chlorobenzene was prepared as described in Example 1. The reaction of this solution with the above charge was carried out by the procedure described in detail in Example 1.

The resulting dyestuff has the formula

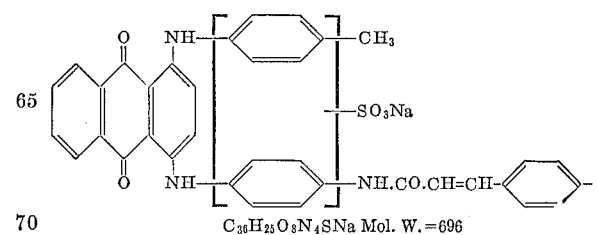

$C_{36}H_{25}O_8N_4SNa$ Mol. W.=696

Weight obtained=7.0 parts by weight equivalent to 100% of the theory.

The green dyeings of this product were similar to the dyeings obtained with the dyestuff of Example 1.

Example 3

A charge of 600 parts of water, 36.2 parts by weight of a 13.4% aqueous paste of monosulfonated 1-phenylamino-4-(4'-aminophenylamino)-anthraquinone (=4.85 parts by weight 100%) prepared as described in Example 1(a) was adjusted to a pH of 9.6 by the addition of 5% sodium hydroxide solution.

A p-methoxycinnamoyl chloride solution was prepared by refluxing for 3 hours a charge of 90 parts by volume, (dry distilled) chlorobenzene, 9 parts by volume thionyl chloride, 3.6 parts by weight p-methoxycinnamic acid, and a trace of pyridine (about 0.05 part by weight). Finally 40 parts by volume of liquid (excess thionyl chloride and chlorobenzene) was distilled off leaving a solution of p-methoxycinnamoyl chloride in chlorobenzene.

The reaction of this solution with the above charge was carried out by the procedure described in Example 1.

The resulting dyestuff has the formula

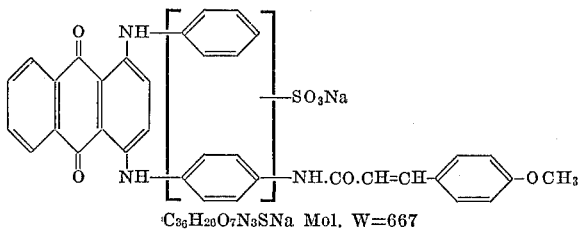

$C_{36}H_{20}O_7N_3SNa$ Mol. W=667

Weight obtained=6.7 parts by weight equivalent to 100% of the theory.

The green dyeings of this product on cotton and rayon were a little bluer than the dyeings obtained with the dyestuff of Example 1. Otherwise the properties were similar.

This invention has been disclosed with respect to certain preferred embodiments, and there will become obvious to persons skilled in the art various modifications and variations thereof which are intended to be included within the spirit and purview of this invention and the scope of the appended claims.

We claim:
1. The product of the process which comprises
 (1) reacting an intermediate of the formula

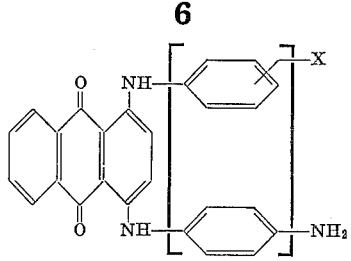

wherein X is H, lower alkyl, lower alkoxy, or halogen, with sulfuric acid of at least 96% concentration, including oleum, at temperatures of about 60–120° C. to introduce one —SO₃H group into one of the bracketed benzene rings and then
 (2) reacting the resulting monosulfonated product with an equimolar amount of a cinnamoyl halide of the formula

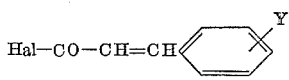

wherein Hal is halogen and Y is H, nitro, amino, lower alkyl, or lower alkoxy, in an aqueous medium at a temperature of about −3 to +30° C. and a pH of about 7 to 11.5.

2. A product as defined in claim 1 wherein X is H, and Y is NO₂ in para position relative to the ethenic linkage.

3. A product as defined in claim 1 wherein X is CH₃ in para position relative to the imino linkage, and Y is NO₂ in para position relative to the ethenic linkage.

4. A product as defined in claim 1 wherein X is H, and Y is OCH₃ in para position to the ethenic linkage.

References Cited by the Examiner
UNITED STATES PATENTS

| | | | |
|---|---|---|---|
| 1,698,821 | 1/1929 | Olgilvie | 260—374 |
| 1,856,802 | 5/1932 | Bally et al. | 260—374 |
| 1,898,748 | 2/1933 | Shepherdson et al. | 260—374 |
| 1,941,063 | 12/1933 | Weinand et al. | 260—372 |
| 2,091,812 | 8/1937 | Haddock et al. | 260—374 |
| 2,824,093 | 2/1958 | Benz et al. | 260—374 |

OTHER REFERENCES

Houben, "Das Anthracene und die Anthrachinone," page 419 (1929).

LORRAINE A. WEINBERGER, *Primary Examiner.*

R. K. JACKSON, *Assistant Examiner.*

UNITED STATES PATENT OFFICE
CERTIFICATE OF CORRECTION

Patent No. 3,271,423                                September 6, 1966

Leon Katz et al.

It is certified that error appears in the above identified patent and that said Letters Patent are hereby corrected as shown below:

Column 4, lines 60 to 70, the extreme right-hand portion of the formula should appear as shown below:

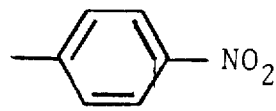

Signed and sealed this 10th day of March 1970.

(SEAL)
Attest:

Edward M. Fletcher, Jr.
Attesting Officer

WILLIAM E. SCHUYLER, JR.
Commissioner of Patents